Figures 2, 3:
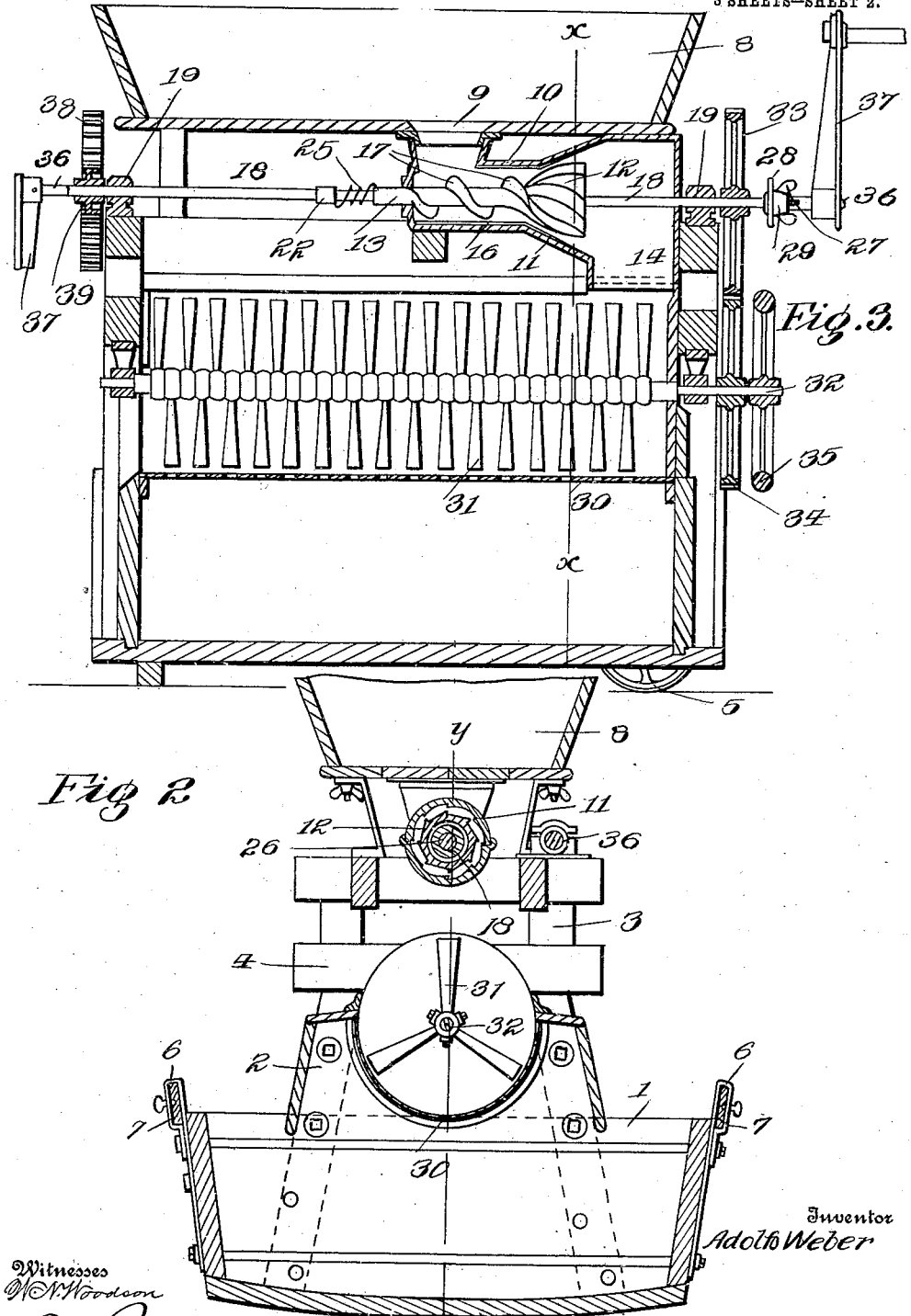

No. 874,713. PATENTED DEC. 24, 1907.
A. WEBER.
MILL.
APPLICATION FILED APR. 16, 1906. RENEWED JUNE 8, 1907.
3 SHEETS—SHEET 1.
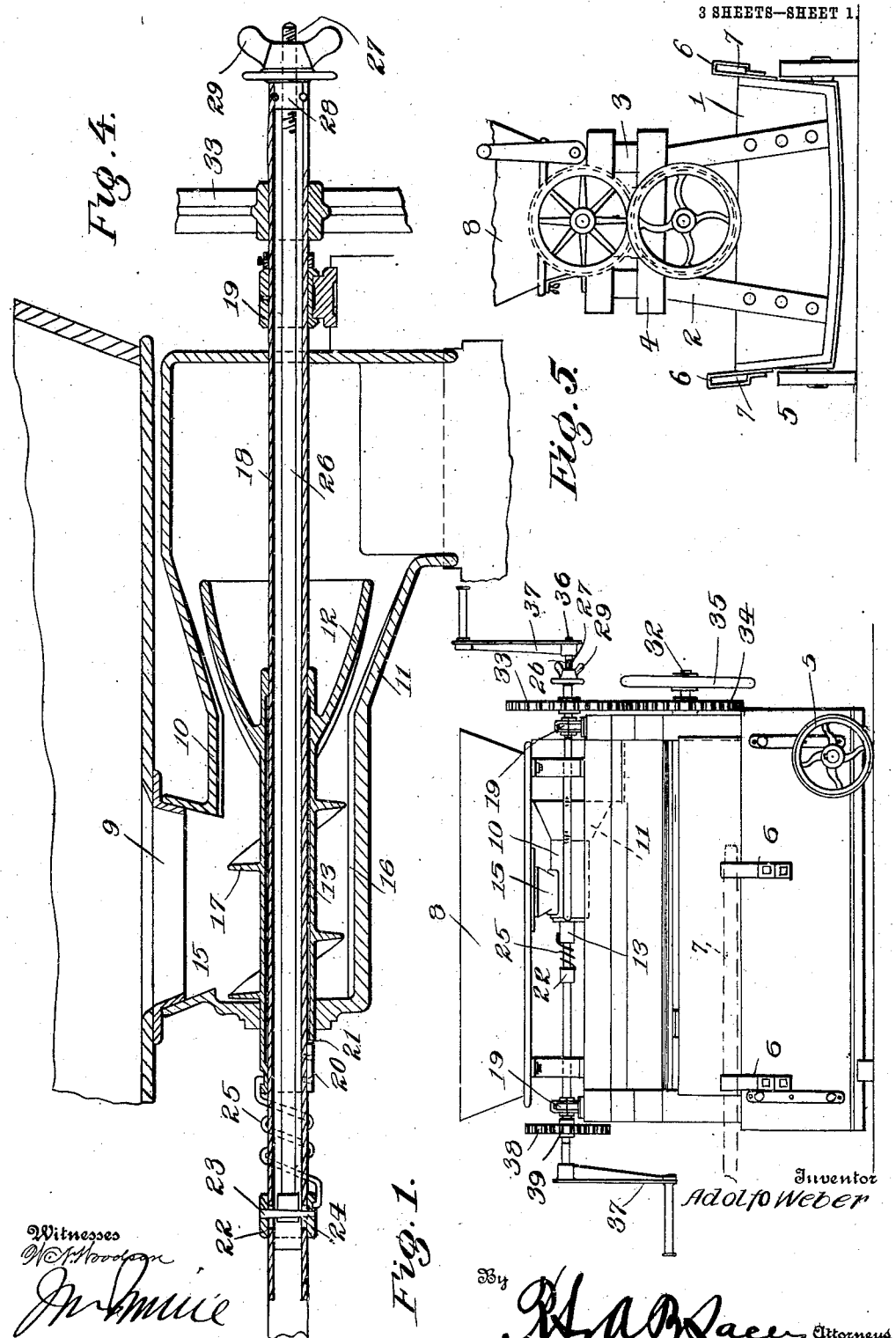
Witnesses
Inventor
Adolfo Weber
By  Attorneys No. 874,713. PATENTED DEC. 24, 1907.
A. WEBER.
MILL.
APPLICATION FILED APR. 16, 1906. RENEWED JUNE 8, 1907.

3 SHEETS—SHEET 2.

Witnesses
W. N. Woodson

Inventor
Adolf Weber
By R. H. A. R. Lacey, Attorneys

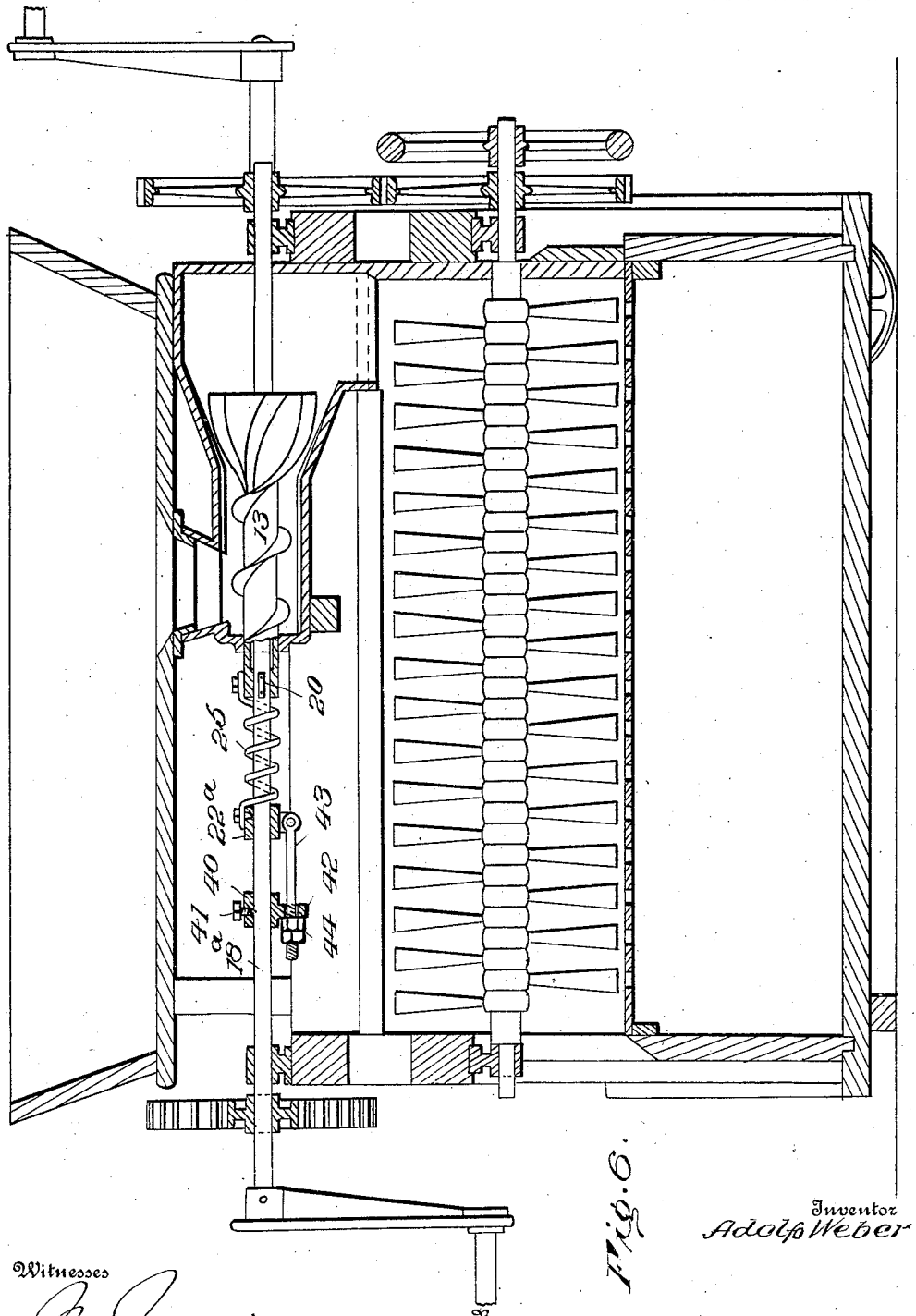

UNITED STATES PATENT OFFICE.

ADOLFO WEBER, OF MILAN, ITALY.

MILL.

No. 874,713.      Specification of Letters Patent.      Patented Dec. 24, 1907.

Application filed April 16, 1906, Serial No. 312,019. Renewed June 8, 1907. Serial No. 378,003.

*To all whom it may concern:*

Be it known that I, ADOLFO WEBER, citizen of Switzerland, residing at Milan, Compartment of Lombardy, Italy, have invented certain new and useful Improvements in Mills, of which the following is a specification.

This invention relates to a machine designed most especially for preparing grapes for the subsequent operation of expressing the juice therefrom, the machine being of such formation as to break the skins, force the pulp therefrom and separate the stems from the mass of pulp, seeds and skins.

The invention consists of a machine of the character and for the purpose aforesaid involving a novel general construction and peculiar means, whereby the work of breaking up or comminuting the fruit or like material is greatly facilitated, and whereby provision is had for regulating the grinding mechanism to a nicety to permit the escape of seeds without breaking the same, and to admit of the grinding mechanism automatically yielding to allow stones or other foreign objects larger than the fruit seeds escaping without producing injurious results.

For a full description of the invention and the merits thereof and also to acquire a knowledge of the details of construction of the means for effecting the result, reference is to be had to the following description and accompanying drawings.

Figure 1 is a side view of a mill embodying the invention. Fig. 2 is a transverse section of the mill on the line $x$—$x$ of Fig. 1, looking to the left as indicated by the arrows. Fig. 3 is a vertical central longitudinal section of the mill on the line $y$—$y$ of Fig. 2. Fig. 4 is a longitudinal section of the grinding mechanism and the adjunctive parts, showing the element on a larger scale. Fig. 5 is an end view of the mill, the upper portion being broken away. Fig. 6 is a view similar to Fig. 3 showing a modification in the mountings and adjusting means for the movable core or bur.

Corresponding and like parts are referred to in the following description and indicated in all the views of the drawings by the same reference characters.

The working parts of the mill are mounted upon a framework of suitable construction and in the preferred embodiment of the invention, the framework is attached to a trough or tank 1 and comprises legs 2, longitudinal bars 3 and cross bars 4, the several parts being connected in any substantial manner at their meeting or crossing points. The trough or tank 1 is preferably mounted upon wheels 5 arranged at one end to admit of trundling the machine when it is required to transport it from one place to another. Keepers 6 are provided at the sides of the trough or tank to receive handle bars 7 which are secured therein when it is required to move the machine after the fashion of the ordinary hand or wheelbarrow.

The mill or machine embodies a hopper 8 which has a longitudinal arrangement and is provided in its bottom with an opening 9 for the escape of the grapes or other material to be prepared for subsequent pressing. Below the hopper 8 is located the grinding mechanism, the same embodying a cylinder 10 having a grinding member 11 at one end and a cone or bur 12 arranged for coöperation with the grinding member 11. The rotary grinding member 12 is carried by a hollow shaft 13 mounted to receive a limited longitudinal movement and a rotary movement, the longitudinal movement providing for varying the space between the grinding faces of the members 11 and 12 to admit of comminuting the material to the desired degree of fineness and also to provide an automatic escape for foreign objects, such as stones, nails and the like, thereby obviating injury to the ribs of the grinding elements. The cylinder 10 is enlarged at its discharge end and a portion intermediate of its ends is flared and ribbed upon its inner side to provide the grinding member 11. An outlet 14 is provided at the lowermost portion of the enlarged end of the cylinder for escape of the material after being ground or comminuted. An inlet 15 is located at the receiving end of the cylinder and is in communication with the outlet opening 9 of the hopper 8, the openings 14 and 15 being arranged at diagonally opposite points of the cylinder. Ribs 16 are provided upon the inner side of the cylinder and extend longitudinally thereof, and, in cross section, said ribs are straight upon one face and are inclined upon the other face, see Fig. 2, thereby presenting the appearance of saw teeth. The ribs 16 extend along the inner side of the flared portion of the cylinder for a short distance and tapered so as to merge into the surface of said flared part, thereby providing the ribs which coöperate with corresponding ribs upon the grinding cone or bur 12.

A spiral flight or rib 17 encircles the shaft 13 and forms a screw feeder, whereby the material is positively moved through the cylinder 10 and grinding mechanism, said rib or flight 17, as well as the cone 12, forming an integral part of the shaft 13. The shaft 13 is mounted upon a hollow shaft 18 which is mounted in bearings 19 secured to the end supports of the framework, said shaft 18 receiving the driving power by means of which the screw feeder and grinding mechanism are actuated and said shaft being held against any longitudinal movement while free to rotate. The shaft 13 is mounted upon the shaft 18 so as to rotate therewith and yet have a limited longitudinal movement to admit of adjustment of the grinding mechanism and the automatic clearing of the matter when gravel or other foreign object is caught between the grinding surfaces. Interlocking means connect the shafts 13 and 18 and as shown consist of a projection 20 fast with the shaft 18 and a slot or groove 21 in the shaft 13 to receive the projection 20. A sleeve 22 is loose upon the shaft 18 and is connected therewith by means of a key 23 which passes through openings formed in the sleeve 22 and shaft 18. The openings 24 formed in opposite sides of the shaft 18, are elongated lengthwise of said shaft to admit of the sleeve 22 having a limited longitudinal play thereon. A spring 25 connects the sleeve 22 with the shaft 13 and determines the relative position of the latter according to the adjustment of the sleeve 22 upon the shaft 18, said spring also providing yielding means whereby the shaft 13 may move independently of the sleeve 22 to admit of the grinding cone or bur 12 automatically moving in the event of a gravel or other foreign object coming between the grinding surfaces so as to prevent injury thereto.

The position of the sleeve 22 may be determined with reference to the shaft 18 in any manner and said sleeve, when adjusted, is adapted to be secured so as to hold the shaft 13 and the movable member 12 of the grinding mechanism in the required adjusted position. This result is effected by the means shown which consist of a rod 26 passed through the shaft 18 and having its inner end enlarged and transversely apertured to receive the key 23, the outer end of said rod being threaded, as shown at 27, and coöperating with a hand nut 28 secured within the outer end of the shaft 18 so as to turn freely with reference to said shaft, but prevented from having any longitudinal play with reference thereto. A jam nut 29 is mounted upon the projecting end of the rod 26 and serves to secure the parts in the adjusted position. Upon turning the hand nut 28 either to the right or to the left, the rod 26 has a longitudinal movement imparted thereto by reason of the screw thread connection between said hand nut and rod 26, and as a result, the sleeve 22 is moved upon the shaft 18 and the shaft 13 is correspondingly moving so as to vary the distance between the grinding surfaces of the members 11 and 12.

Below the grinding mechanism is arranged a separator the same consisting of a trough 30 and a combined agitator and feeder 31. The trough 30 is preferably semi-circular in transverse section and formed of perforated sheet metal having its longitudinal edge portions secured to the longitudinal bars of the framework. The trough extends the entire length of the machine and receives the material at one end and is open at its opposite end to discharge the stems and like foreign matter. The combined feeder and agitator consists of a shaft 32 to which a series of blades are attached, said blades being slightly inclined with reference to the direction or rotation of the shaft 32 to positively move the mass along the trough from the receiving to the discharge end. The mass is thoroughly worked by the blades to cause the pulp, skins and seeds to pass through the openings of the trough, whereas the stems and like matter finally escaped at the delivery end of the trough. The juice, pulp and the like passing through openings of the trough are received by the tank or like receptacle 1.

Power is preferably applied to the shaft 18 and is taken therefrom for operating the combined feeder and agitator 31 and for this purpose intermeshing gear wheels 33 and 34 are fast to the respective shafts 18 and 32, the latter in turn being supplied with a balance wheel 35 to steady the motion. For convenience of applying the power and particularly when the machine is to be operated by hand, a counterbalance 36 is located at one side of the machine and is provided at opposite ends with crank handles 37, and this countershaft has a spur gear 38 fast thereto and in mesh with a spur pinion 39 fast to the shaft 18. The fruit or the like to be prepared for subsequent compressing action for removal of the juice is placed in quantity in the hopper 8 and is directed thereby into the cylinder 10 through the openings 9 and 15 and is fed to the grinding mechanism by the screw feeder 17 and after being comminuted or ground escapes through the opening 14 into the separator, which latter, as stated, removes the woody matter and other foreign substances from the pulp and skins, the latter passing into the trough or tank 1 to be subsequently manipulated as may be required. The distance between the grinding surfaces is regulated by means of the hand nut 28 in the manner stated and should a gravel or other foreign object come between the grinding surfaces, the latter automatically yield by reason of the spring connection 25 to permit the escape of such gravel or foreign body, thereby preventing injury to the grinding mechanism, as will be readily comprehended.

In the construction shown in Fig. 6, the hollow shaft 18 is dispensed with and replaced by a shaft 18ª which is preferably solid and upon which the part 13 and cone or bur 12 are mounted for longitudinal adjustment, being caused to revolve with the shaft by any securing means. A sleeve 22ª adjustable upon the shaft 18ª is connected with the shaft 13 by means of a spring 25 and by moving the sleeve 22ª upon the shaft 18, the distance between the grinding elements 11 and 12 is regulated. A sleeve 40 is secured to the shaft 18ª in any manner, preferably by means of a set screw 41 and is provided with an off standing lug 42 apertured to receive the threaded end of a rod 43 which is connected at its opposite end to the sleeve 22ª. Jam nuts 44 are mounted upon the threaded end of the rod 43 to hold the said rod and the sleeve 22ª in the required adjusted position. It will be understood that the provision of the parts 40, 43 and 44 materially simplifies the construction and renders the same readily accessible, and also enabling repairs to be cheaply made.

Having thus described the invention, what is claimed as new is:

1. In a mill, the combination of a grinding mechanism embodying a stationary shell and a rotary bur, a rotary shaft having the bur mounted thereon and splined thereto, a sleeve mounted on said shaft to move longitudinally thereon and to rotate therewith, a tension spring between the sleeve and bur, and means for adjusting the said sleeve to vary the tension of the spring.

2. In a mill, the combination of the grinding mechanism embodying a stationary shell and a rotary bur, a hollow shaft having the bur mounted thereon and splined thereto, a sleeve mounted on said shaft to turn therewith and move longitudinally thereon, a tension spring interposed between said sleeve and the rotary bur, a rod located in said hollow shaft and having connection with the said sleeve, and means for moving said rod longitudinally and securing the same in the adjusted position.

3. In a mill, the combination of the grinding mechanism embodying a stationary shell and a rotary bur, a hollow shaft having the rotary bur mounted thereon and splined thereto, a sleeve mounted on the hollow shaft, to turn therewith and to move longitudinally thereon, a tension spring between said sleeve and the rotary bur, a rod arranged within the hollow shaft, a key connecting the said sleeve and rod and passed through longitudinal slots in opposite sides of the hollow shaft to cause the rod, shaft and sleeve to rotate together while admitting of relative longitudinal movement of the rod and sleeve, a set nut threaded upon a projecting end of said rod, and a jam nut for securing the part in adjusted position.

In testimony whereof I affix my signature in presence of two witnesses.

ADOLFO WEBER. [L. S.]

Witnesses:
H. P. SMITH,
RESTELLI HIUS.